United States Patent
Hsiao et al.

(10) Patent No.: US 9,742,265 B2
(45) Date of Patent: Aug. 22, 2017

(54) POWER SUPPLY METHOD FOR AVOIDING AUDIO NOISE AND POWER SUPPLY APPARATUS FOR AVOIDING AUDIO NOISE

(71) Applicant: Chicony Power Technology Co., Ltd., New Taipei (TW)

(72) Inventors: Yung-Hung Hsiao, New Taipei (TW); Cheng-Chang Hsiao, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 34 days.

(21) Appl. No.: 14/741,878

(22) Filed: Jun. 17, 2015

(65) Prior Publication Data

US 2016/0373090 A1    Dec. 22, 2016

(51) Int. Cl.
| | |
|---|---|
| *H02M 1/08* | (2006.01) |
| *H02M 3/04* | (2006.01) |
| *H02M 1/44* | (2007.01) |
| *H02M 1/00* | (2006.01) |

(52) U.S. Cl.
CPC .............. *H02M 3/04* (2013.01); *H02M 1/44* (2013.01); *H02M 2001/0035* (2013.01)

(58) Field of Classification Search
CPC ..... H02M 1/08; H02M 3/156; H02M 3/33507
USPC .................. 323/282, 351; 363/97
See application file for complete search history.

(56) References Cited

U.S. PATENT DOCUMENTS

| | | | |
|---|---|---|---|
| 7,313,004 B1 * | 12/2007 | Yang ................. | H02M 3/33523 363/21.02 |
| 2009/0168475 A1 | 7/2009 | Hirosawa | |
| 2009/0201705 A1 * | 8/2009 | Murata ................. | H02M 1/32 363/53 |
| 2010/0102642 A1 * | 4/2010 | Odaohhara ........... | H02M 3/158 307/125 |

(Continued)

FOREIGN PATENT DOCUMENTS

| | | |
|---|---|---|
| JP | 2002136125 A | 5/2002 |
| JP | 2006050760 A | 2/2006 |
| JP | 2012182953 A | 9/2012 |

OTHER PUBLICATIONS

Office Action Dated May 31, 2016 of the Corresponding Japan Patent Application No. 2015-124548.

(Continued)

*Primary Examiner* — Jeffrey Sterrett
(74) *Attorney, Agent, or Firm* — Chun-Ming Shih; HDLS IPR Services

(57) ABSTRACT

A power supply apparatus (10) includes a voltage input side (102), a power switch circuit (104), a voltage output side (106), a pulse width modulation signal generating circuit (108) and a burst frequency detection circuit (110). According to a pulse width modulation signal (114), the pulse width modulation signal generating circuit (108) controls the power switch circuit (104), so that the power supply apparatus (10) enters a burst mode. The burst frequency detection circuit (110) detects a burst frequency of the power switch circuit (104). The burst frequency detection circuit (110)

(Continued)

informs the pulse width modulation signal generating circuit (108) that the burst frequency is in an audio frequency range if the burst frequency is in the audio frequency range. The power supply apparatus (10) leaves from the burst mode to avoid audio noise.

10 Claims, 2 Drawing Sheets

(56) References Cited

U.S. PATENT DOCUMENTS

| | | | | |
|---|---|---|---|---|
| 2011/0051470 | A1* | 3/2011 | Li | H02M 3/33515 363/21.15 |
| 2011/0175584 | A1* | 7/2011 | Huber | H02M 3/158 323/282 |
| 2012/0163039 | A1* | 6/2012 | Halberstadt | H02M 3/3376 363/21.02 |
| 2013/0229226 | A1 | 9/2013 | Chiu | |
| 2015/0236598 | A1* | 8/2015 | Krueger | H02M 3/33507 363/21.17 |
| 2015/0357925 | A1* | 12/2015 | Tsou | H02M 3/33507 363/21.15 |
| 2016/0156271 | A1* | 6/2016 | Nishijima | H02M 3/33523 363/21.12 |

OTHER PUBLICATIONS

Office Action Dated Mar. 4, 2016 of the Corresponding German Patent Application No. 102015110163.7.

\* cited by examiner

POWER SUPPLY METHOD FOR AVOIDING AUDIO NOISE AND POWER SUPPLY APPARATUS FOR AVOIDING AUDIO NOISE

BACKGROUND OF THE INVENTION

Field of the Invention

The present invention relates to a power supply method and a power supply apparatus, and especially relates to a power supply method for avoiding audio noise and a power supply apparatus for avoiding audio noise.

Description of the Related Art

The power supply apparatus will enter the burst mode to save energy when the power supply apparatus is in the standby mode or in the light load mode.

Usually a human can hear sound of 20 hertz to 20000 hertz, which is called the audio frequency.

It is very annoying if the burst frequency of the power supply apparatus is in the audio frequency range when the power supply apparatus works in the burst mode.

SUMMARY OF THE INVENTION

In order to solve the above-mentioned problems, an object of the present invention is to provide a power supply method for avoiding audio noise.

In order to solve the above-mentioned problems, another object of the present invention is to provide a power supply method for avoiding audio noise.

In order to solve the above-mentioned problems, still another object of the present invention is to provide a power supply apparatus for avoiding audio noise.

In order to achieve the object of the present invention mentioned above, the power supply method comprises following steps. A power supply apparatus leaves from a burst mode to avoid audio noise when the power supply apparatus is in the burst mode and a burst frequency of the power supply apparatus is in an audio frequency range.

In order to achieve another object of the present invention mentioned above, the power supply method comprises following steps. A power supply apparatus enters a burst mode. A burst frequency of the power supply apparatus is detected after the power supply apparatus enters the burst mode. The power supply apparatus leaves from the burst mode to avoid audio noise if the burst frequency of the power supply apparatus is in an audio frequency range.

In order to achieve still another object of the present invention mentioned above, the power supply apparatus comprises a voltage input side, a power switch circuit, a voltage output side, a pulse width modulation signal generating circuit and a burst frequency detection circuit. The power switch circuit is electrically connected to the voltage input side. The voltage output side is electrically connected to the power switch circuit. The pulse width modulation signal generating circuit is electrically connected to the power switch circuit. The burst frequency detection circuit is electrically connected to the power switch circuit and the pulse width modulation signal generating circuit. According to a pulse width modulation signal, the pulse width modulation signal generating circuit controls the power switch circuit, so that the power supply apparatus enters a burst mode. The burst frequency detection circuit detects a burst frequency of the power switch circuit after the power supply apparatus enters the burst mode. The burst frequency detection circuit informs the pulse width modulation signal generating circuit that the burst frequency is in an audio frequency range if the burst frequency of the power switch circuit is in the audio frequency range. After the burst frequency detection circuit informs the pulse width modulation signal generating circuit that the burst frequency is in the audio frequency range, according to the pulse width modulation signal, the pulse width modulation signal generating circuit controls the power switch circuit, so that the power supply apparatus leaves from the burst mode to avoid audio noise.

The advantage of the present invention is that the power supply apparatus leaves from the burst mode to avoid audio noise when the power supply apparatus is in the burst mode and the burst frequency of the power supply apparatus is in the audio frequency range.

DETAILED DESCRIPTION OF THE INVENTION

Please refer to following detailed description and figures for the technical content of the present invention. The following detailed description and figures are referred for the present invention, but the present invention is not limited to it.

Figure 1:
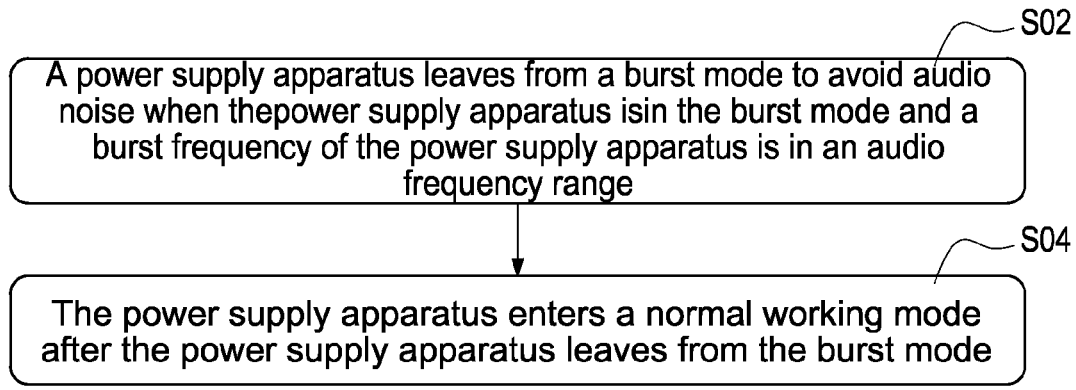
FIG. 1 shows a flow chart of the first embodiment of the power supply method of the present invention.

FIG. 1 shows a flow chart of the first embodiment of the power supply method of the present invention. The power supply method of the present invention comprises following steps.

S02: A power supply apparatus leaves from a burst mode to avoid audio noise when the power supply apparatus is in the burst mode and a burst frequency of the power supply apparatus is in an audio frequency range.

S04: The power supply apparatus enters a normal working mode after the power supply apparatus leaves from the burst mode.

Moreover, the audio frequency range is 20 hertz to 20000 hertz. The normal working mode will be described in details later.

The advantage of the present invention is that the power supply apparatus leaves from the burst mode to avoid audio noise when the power supply apparatus is in the burst mode and the burst frequency of the power supply apparatus is in the audio frequency range.

Figure 2:
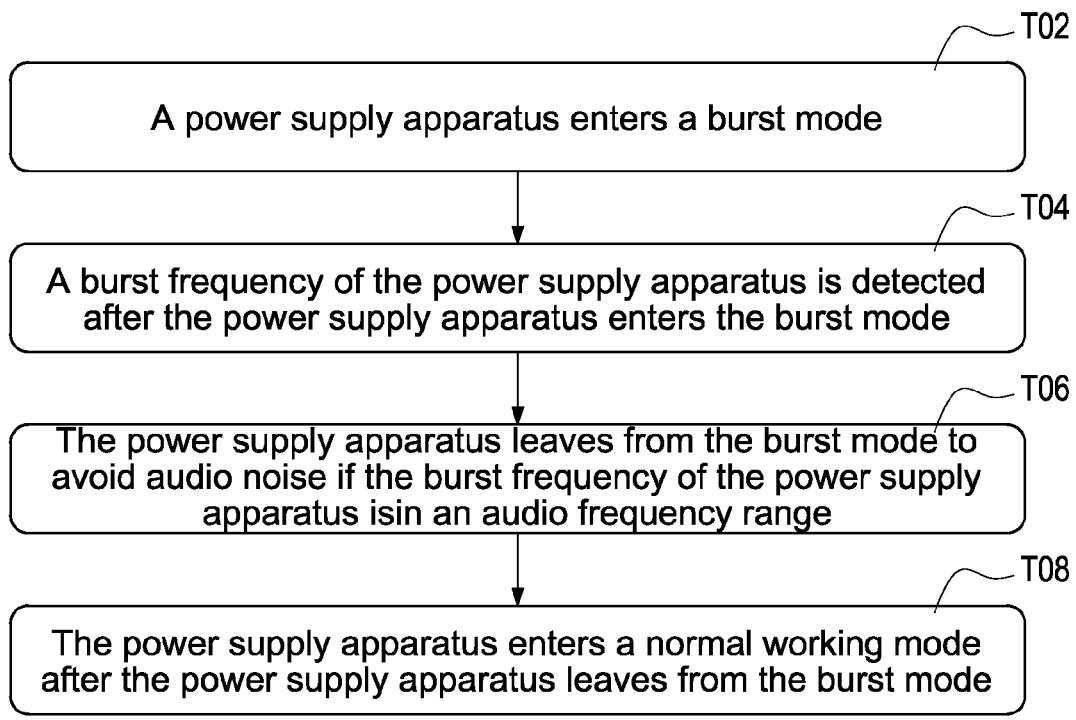
FIG. 2 shows a flow chart of the second embodiment of the power supply method of the present invention.

FIG. 2 shows a flow chart of the second embodiment of the power supply method of the present invention. The power supply method of the present invention comprises following steps.

T02: A power supply apparatus enters a burst mode.

T04: A burst frequency of the power supply apparatus is detected after the power supply apparatus enters the burst mode.

T06: The power supply apparatus leaves from the burst mode to avoid audio noise if the burst frequency of the power supply apparatus is in an audio frequency range.

T08: The power supply apparatus enters a normal working mode after the power supply apparatus leaves from the burst mode.

Moreover, the audio frequency range is 20 hertz to 20000 hertz. The normal working mode will be described in details later.

The advantage of the present invention is that the power supply apparatus leaves from the burst mode to avoid audio noise when the power supply apparatus is in the burst mode and the burst frequency of the power supply apparatus is in the audio frequency range.

Figure 3:
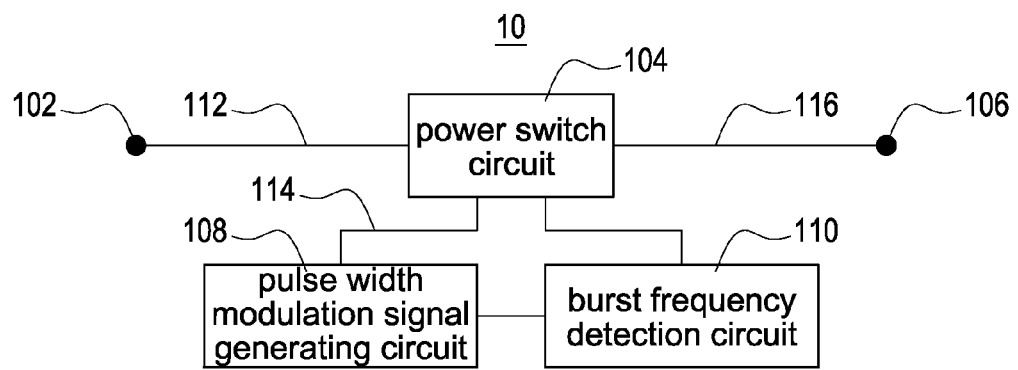
FIG. 3 shows a block diagram of the power supply apparatus of the present invention.

FIG. 3 shows a block diagram of the power supply apparatus of the present invention. A power supply apparatus 10 comprises a voltage input side 102, a power switch circuit 104, a voltage output side 106, a pulse width modulation signal generating circuit 108 and a burst frequency detection circuit 110.

The power switch circuit 104 is electrically connected to the voltage input side 102. The voltage output side 106 is electrically connected to the power switch circuit 104. The pulse width modulation signal generating circuit 108 is electrically connected to the power switch circuit 104. The burst frequency detection circuit 110 is electrically connected to the power switch circuit 104 and the pulse width modulation signal generating circuit 108.

According to a pulse width modulation signal 114, the pulse width modulation signal generating circuit 108 controls the power switch circuit 104, so that the power supply apparatus 10 enters a burst mode. The burst frequency detection circuit 110 detects a burst frequency of the power switch circuit 104 after the power supply apparatus 10 enters the burst mode. The burst frequency detection circuit 110 informs the pulse width modulation signal generating circuit 108 that the burst frequency is in an audio frequency range if the burst frequency of the power switch circuit 104 is in the audio frequency range. After the burst frequency detection circuit 110 informs the pulse width modulation signal generating circuit 108 that the burst frequency is in the audio frequency range, according to the pulse width modulation signal 114, the pulse width modulation signal generating circuit 108 controls the power switch circuit 104, so that the power supply apparatus 10 leaves from the burst mode to avoid audio noise.

An input voltage 112 is sent to the power switch circuit 104 through the voltage input side 102. The pulse width modulation signal generating circuit 108 sends the pulse width modulation signal 114 to the power switch circuit 104, so that the power switch circuit 104 is controlled by the pulse width modulation signal 114 to convert the input voltage 112 into an output voltage 116. The power switch circuit 104 outputs the output voltage 116 through the voltage output side 106.

After the power supply apparatus 10 leaves from the burst mode, according to the pulse width modulation signal 114, the pulse width modulation signal generating circuit 108 controls the power switch circuit 104, so that the power supply apparatus 10 enters a normal working mode.

Moreover, the audio frequency range is 20 hertz to 20000 hertz.

Figure 4:
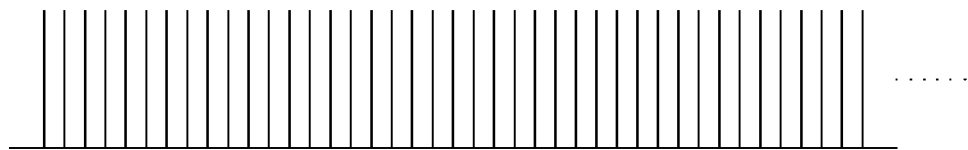
FIG. 4 shows a waveform diagram of a plurality of embodiments of the pulse width modulation signal.
Figure 4:
Figure 4:
Figure 4:

FIG. 4 shows a waveform diagram of a plurality of embodiments of the pulse width modulation signal. The top-down second waveform, the top-down third waveform and the top-down fourth waveform show that the power supply apparatus 10 works in the burst mode. Longer break time exists between the burst clumps. The frequency of the burst clump is called the burst frequency. The output voltage 116 is determined by the pulse quantity of the burst clump, the pulse frequency of the burst clump, the pulse duty cycle of the burst clump and the burst frequency.

The top-down first waveform shows that the power supply apparatus 10 works in the normal working mode (namely, the power supply apparatus 10 leaves from the burst mode). At this time, no burst frequency exists. The output voltage 116 is determined by the pulse frequency and the pulse duty cycle.

The load in accordance with the top-down fourth waveform is the minimum. The load in accordance with the top-down third waveform is greater than the load in accordance with the top-down fourth waveform. The load in accordance with the top-down second waveform is greater than the load in accordance with the top-down third waveform. The load in accordance with the top-down first waveform is greater than the load in accordance with the top-down second waveform.

Usually, the burst frequency is higher if the load is larger. The power supply apparatus 10 of the present invention leaves from the burst mode and enters the normal working mode to avoid audio noise when the burst frequency is in the audio frequency range.

In an embodiment, the burst frequency is detected when the power supply apparatus 10 is determined to enter the burst mode (for examples, in the standby mode or in the light load mode). The power supply apparatus 10 enters the normal working mode to avoid audio noise if the burst frequency is in the audio frequency range. The power supply apparatus 10 works in the burst mode if the burst frequency is not in the audio frequency range.

The advantage of the present invention is that the power supply apparatus 10 leaves from the burst mode to avoid audio noise when the power supply apparatus 10 is in the burst mode and the burst frequency of the power supply apparatus 10 is in the audio frequency range.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A power supply method comprising:
   a. a power supply apparatus (10) leaving from a burst mode to avoid audio noise when the power supply apparatus (10) is in the burst mode and a burst frequency of the power supply apparatus (10) is in an audio frequency range,
   wherein when the power supply apparatus (10) enters the burst mode, first the burst frequency of the power supply apparatus (10) is lower than the audio frequency range, and second the burst frequency of the power supply apparatus (10) is increasing according to a load being increasing until the burst frequency of the power supply apparatus (10) enters the audio frequency range, the power supply apparatus (10) enters a normal working mode;
   wherein the burst frequency is a frequency of a burst clump in the burst mode, and when a load connected to the power supply apparatus (10) is gradually increased, a number of a pulse waves in the burst clump gradually increases as the load gradually increases.

2. The power supply method in claim 1, further comprising:

b. the power supply apparatus (10) entering the normal working mode after the power supply apparatus (10) leaves from the burst mode.

3. The power supply method in claim 1, wherein the audio frequency range is 20 hertz to 20000 hertz.

4. A power supply method comprising:
   a. a power supply apparatus (10) entering a burst mode;
   b. detecting a burst frequency of the power supply apparatus (10) after the power supply apparatus (10) enters the burst mode; and
   c. the power supply apparatus (10) leaving from the burst mode to avoid audio noise if the burst frequency of the power supply apparatus (10) is in an audio frequency range,
   wherein when the power supply apparatus (10) enters the burst mode, first the burst frequency of the power supply apparatus (10) is lower than the audio frequency range, and second the burst frequency of the power supply apparatus (10) is increasing according to a load being increasing until the burst frequency of the power supply apparatus (10) enters the audio frequency range, the power supply apparatus (10) enters a normal working mode;
   wherein the burst frequency is a frequency of a burst clump in the burst mode, and when a load connected to the power supply apparatus (10) is gradually increased, a number of a pulse waves in the burst clump gradually increases as the load gradually increases.

5. The power supply method in claim 4, further comprising:
   d. the power supply apparatus (10) entering the normal working mode after the power supply apparatus (10) leaves from the burst mode.

6. The power supply method in claim 4, wherein the audio frequency range is 20 hertz to 20000 hertz.

7. A power supply apparatus (10) comprising:
   a voltage input side (102);
   a power switch circuit (104) electrically connected to the voltage input side (102);
   a voltage output side (106) electrically connected to the power switch circuit (104);
   a pulse width modulation signal generating circuit (108) electrically connected to the power switch circuit (104); and
   a burst frequency detection circuit (110) electrically connected to the power switch circuit (104) and the pulse width modulation signal generating circuit (108),
   wherein according to a pulse width modulation signal (114), the pulse width modulation signal generating circuit (108) controls the power switch circuit (104), so that the power supply apparatus (10) enters a burst mode; the burst frequency detection circuit (110) detects a burst frequency of the power switch circuit (104) after the power supply apparatus (10) enters the burst mode; the burst frequency detection circuit (110) informs the pulse width modulation signal generating circuit (108) that the burst frequency is in an audio frequency range if the burst frequency of the power switch circuit (104) is in the audio frequency range; after the burst frequency detection circuit (110) informs the pulse width modulation signal generating circuit (108) that the burst frequency is in the audio frequency range, according to the pulse width modulation signal (114), the pulse width modulation signal generating circuit (108) controls the power switch circuit (104), so that the power supply apparatus (10) leaves from the burst mode to avoid audio noise; wherein when the power supply apparatus (10) enters the burst mode, first the burst frequency of the power supply apparatus (10) is lower than the audio frequency range, and second the burst frequency of the power supply apparatus (10) is increasing according to a load being increasing until the burst frequency of the power supply apparatus (10) enters the audio frequency range, the power supply apparatus (10) enters a normal working mode;
   wherein the burst frequency is a frequency of a burst clump in the burst mode, and when a load connected to the power supply apparatus (10) is gradually increased, a number of a pulse waves in the burst clump gradually increases as the load gradually increases.

8. The power supply apparatus (10) in claim 7, wherein an input voltage (112) is sent to the power switch circuit (104) through the voltage input side (102); the pulse width modulation signal generating circuit (108) sends the pulse width modulation signal (114) to the power switch circuit (104), so that the power switch circuit (104) is controlled by the pulse width modulation signal (114) to convert the input voltage (112) into an output voltage (116); the power switch circuit (104) outputs the output voltage (116) through the voltage output side (106).

9. The power supply apparatus (10) in claim 7, wherein after the power supply apparatus (10) leaves from the burst mode, according to the pulse width modulation signal (114), the pulse width modulation signal generating circuit (108) controls the power switch circuit (104), so that the power supply apparatus (10) enters the normal working mode.

10. The power supply apparatus (10) in claim 7, wherein the audio frequency range is 20 hertz to 20000 hertz.

\* \* \* \* \*